US012568057B1

(12) United States Patent　　　　　　(10) Patent No.: US 12,568,057 B1
Murillo et al.　　　　　　　　　　　　(45) Date of Patent: Mar. 3, 2026

(54) ARTIFICIAL REALITY MESSAGING WITH DESTINATION SELECTION

(71) Applicant: Meta Platforms Technologies, LLC, Menlo Park, CA (US)

(72) Inventors: Oscar Murillo, Redmond, WA (US); Fang-Yu Yang, Seattle, WA (US); Annika Rodrigues, Lynnwood, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 22 days.

(21) Appl. No.: 18/454,891

(22) Filed: Aug. 24, 2023

Related U.S. Application Data

(63) Continuation of application No. 17/360,864, filed on Jun. 28, 2021, now Pat. No. 11,743,215.

(51) Int. Cl.
| | |
|---|---|
| *G06F 15/16* | (2006.01) |
| *G06F 40/103* | (2020.01) |
| *H04L 51/043* | (2022.01) |
| *H04L 51/046* | (2022.01) |
| *H04L 51/216* | (2022.01) |

(52) U.S. Cl.
CPC .......... *H04L 51/043* (2013.01); *G06F 40/103* (2020.01); *H04L 51/046* (2013.01); *H04L 51/216* (2022.05)

(58) Field of Classification Search
CPC ... H04L 51/043; H04L 51/046; H04L 51/216; G06F 40/103
USPC ........................................................ 709/206
See application file for complete search history.

(56) References Cited

U.S. PATENT DOCUMENTS

| | | | |
|---|---|---|---|
| 10,733,371 B1 | 8/2020 | Baloga et al. | |
| 11,743,215 B1 * | 8/2023 | Murillo ................. | H04L 51/043 709/206 |
| 11,792,141 B2 | 10/2023 | El Ghazzal | |
| 2004/0073616 A1 | 4/2004 | Fellenstein et al. | |
| 2006/0168026 A1 | 7/2006 | Keohane et al. | |

(Continued)

FOREIGN PATENT DOCUMENTS

| | | |
|---|---|---|
| CN | 110034998 A | 7/2019 |
| CN | 110781286 A | 2/2020 |

OTHER PUBLICATIONS

European Search Report for European Application No. 22151157.9, mailed May 25, 2022, 6 pages.

(Continued)

*Primary Examiner* — Imad Hussain
(74) *Attorney, Agent, or Firm* — Morgan, Lewis & Bockius LLP

(57) ABSTRACT

Aspects of the present disclosure are directed to an XR messaging system that can conduct a message thread between multiple users, where individual messages can be designated for delivery to particular artificial reality locations or devices. When sending a message, a user can choose to send the message to a particular destination associated with one or more other users on the message thread. When such a destination selection is made, the message can be formatted for viewing at the selected destination by applying a template, to the message, selected based on the template being configured for the types of data defined in the message and for the type of the destination.

20 Claims, 13 Drawing Sheets

(56) References Cited

U.S. PATENT DOCUMENTS

| 2007/0183430 | A1* | 8/2007 | Asmussen | H04N 21/44012 |
| | | | | 370/395.51 |
| 2007/0223444 | A1 | 9/2007 | Foo et al. | |
| 2008/0183828 | A1 | 7/2008 | Sehgal et al. | |
| 2009/0300122 | A1 | 12/2009 | Freer | |
| 2012/0196614 | A1 | 8/2012 | Arora et al. | |
| 2014/0280623 | A1 | 9/2014 | Duan | |
| 2015/0206349 | A1* | 7/2015 | Rosenthal | G06T 19/006 |
| | | | | 345/633 |
| 2015/0350122 | A1 | 12/2015 | Roch et al. | |
| 2017/0250931 | A1 | 8/2017 | Ioannou et al. | |
| 2017/0337199 | A1 | 11/2017 | Kogan et al. | |
| 2018/0045963 | A1* | 2/2018 | Hoover | G02B 27/0189 |
| 2018/0089588 | A1 | 3/2018 | Ravi et al. | |
| 2018/0140099 | A1 | 5/2018 | Peters | |
| 2018/0210874 | A1 | 7/2018 | Fuxman et al. | |
| 2018/0367476 | A1 | 12/2018 | Sharp et al. | |
| 2019/0033965 | A1 | 1/2019 | Raghunath et al. | |
| 2019/0107990 | A1 | 4/2019 | Spivack et al. | |
| 2019/0333020 | A1 | 10/2019 | Zhao et al. | |
| 2020/0092243 | A1 | 3/2020 | Milligan et al. | |
| 2020/0320300 | A1* | 10/2020 | Jung | G06Q 50/01 |
| 2020/0327275 | A1 | 10/2020 | McGinnis | |
| 2020/0374243 | A1 | 11/2020 | Jina et al. | |

OTHER PUBLICATIONS

Office Action mailed Mar. 23, 2024 for Chinese Application No. 202210028617.9, filed Jan. 11, 2022, 23 pages.
Office Action mailed Mar. 28, 2025 for Chinese Application No. 202210028617.9, filed Jan. 11, 2022, 4 pages.

* cited by examiner

ARTIFICIAL REALITY MESSAGING WITH DESTINATION SELECTION

CROSS-REFERENCE TO RELATED APPLICATIONS

This patent application is a continuation of U.S. patent application Ser. No. 17/360,864, filed Jun. 28, 2021, titled "Artificial Reality Messaging with Destination Selection," currently pending and which is incorporated herein by reference in its entirety.

TECHNICAL FIELD

The present disclosure is directed to conducting a message thread between multiple users where individual messages can be designated for delivery to particular artificial reality locations or devices.

BACKGROUND

In an artificial reality (XR) environment, some of the objects that a user can see and interact with are virtual objects, which can be representations of objects generated by a computer system. Devices such as head-mounted displays (e.g., smart glasses, VR/AR headsets), mobile devices (e.g., smartphones, tablets), projection systems, "cave" systems, or other computing systems can present an artificial reality environment to the user, who can interact with virtual objects in the environment using body gestures and/or controllers. For example, a user can select, move, scale/resize, skew, rotate, change colors/textures/skins of, or apply any other imaginable action to a virtual object. Some of the objects that a user can also interact with are real (real-world) objects, which exist independently of the computer system controlling the artificial reality environment. For example, a user can select a real object and add a virtual overlay to change the way the object appears in the environment (e.g., color, texture), select a real object and be shown a virtual user interface next to the object to interact with it, or cause the real object to have interactions with virtual objects. As used herein, unless otherwise specified, an "object" can be a real or virtual object.

There are multiple communication systems that users can employ to message with other users. For example, users can conduct voice calls, video calls, exchange text-based messages (e.g., SMS, email, IM, etc.), and send back and forth virtual objects. In some cases, a user concurrently maintains multiple threads with the same other user to employ different messaging modalities offered by the various communication systems.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
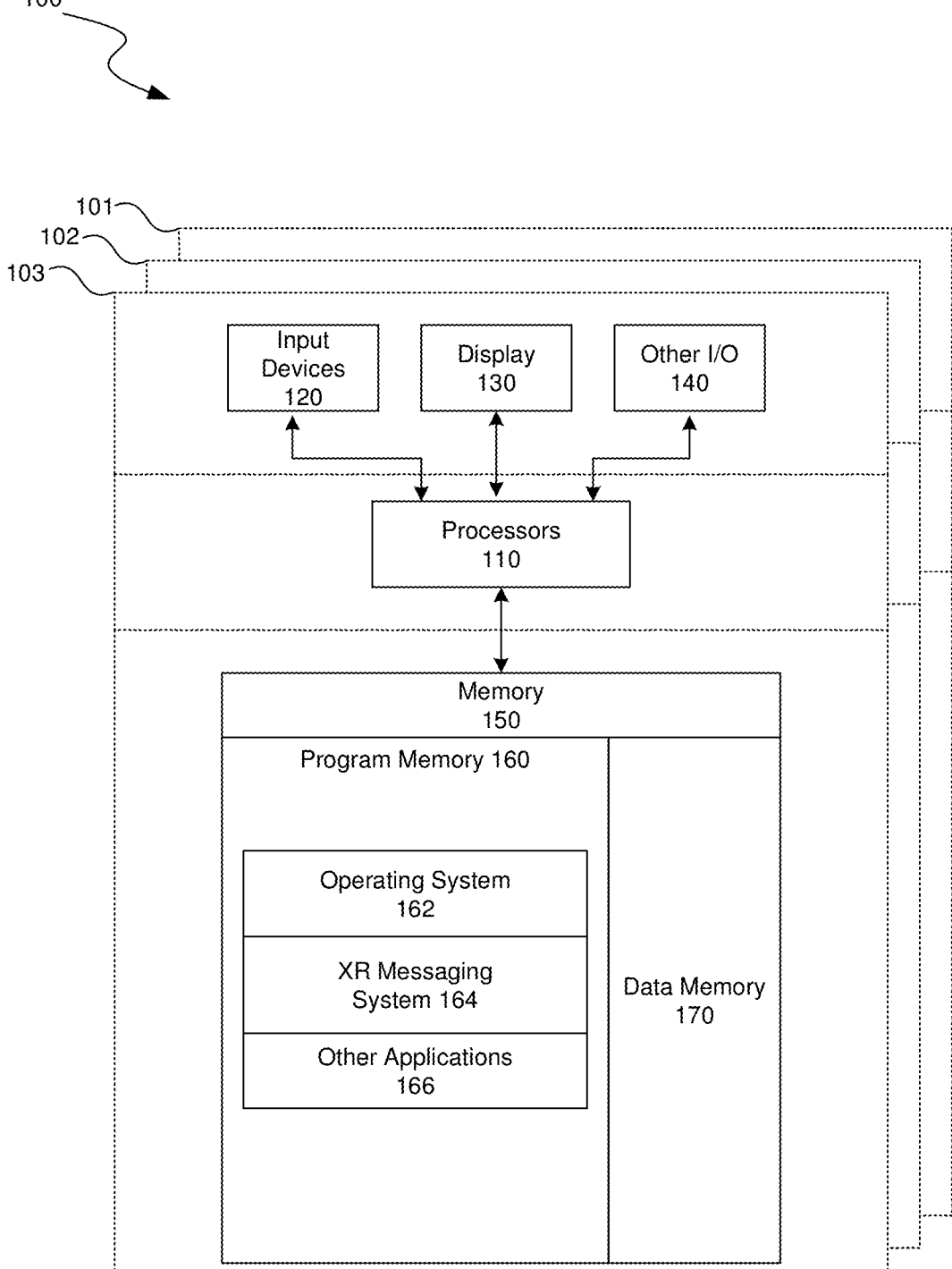
FIG. 1 is a block diagram illustrating an overview of devices on which some implementations of the present technology can operate.

Aspects of the present disclosure are directed to an XR messaging system that can conduct a message thread between multiple users, where individual messages can be designated for delivery to particular artificial reality locations or devices. Multiple users can engage in a "message thread" which can include a link between two or more users where messages of one or more data types are exchanged, such as voice, video, audio, images, 3D models, or other content items. When sending a message, a user can choose to send the message to a particular destination associated with one or more other users on the message thread. When such a destination selection is made, the message can be formatted for viewing at the selected destination by applying a template, to the message, selected based on the template being configured for the types of data defined in the message and for the type of the destination. Received messages designated for a particular destination can be viewable at that destination or a notification of the message can be displayed at that destination. In some implementations, the message thread can also be viewed from other locations (e.g., through a messaging application) and messages are included in the thread, no matter which destination they are addressed to.

A recipient user can establish multiple destinations to which another user can send messages. This can include selecting the destinations, either as devices or "XR locations" (also referred to herein as an "XR spaces" or "XR surfaces," which can be physical points, surfaces, or volumes recognizable by an XR device to which content can be pinned). In some cases, some destinations can be setup for a user by default (e.g., a user's desk is set as a messaging destination unless the user disables this destination) or destinations can be established automatically through other actions (e.g., a device is automatically set as a destination when a messaging service is installed on the device). The recipient user may also set permissions for who can send messages to the established destinations and/or which other users with XR devices can see content shared to the established XR destinations. Additional details on establishing destinations to which messages can be sent are provided below in relation to FIG. 5.

When a sending user decides to send a message to a particular location, the sending user can provide the content of the message and select the destination(s). The XR messaging system (on the sending computing system, receiving computing system, or by an intermediary computing system) can then select a template configured to receive the types of data the user has provided and configured to output those data types in a type of the selected destination. The templated message can be provided to a recipient system for delivery to the recipient user. Additional details on sending a message to a destination established for a recipient are provided below in relation to FIG. 6.

The recipient system can receive the message, template it if not already templated, and provide a notification to the recipient user that a new message is available. Where the destination is an XR location, a notification of the new message can be provided in the XR location when the recipient user is near the XR location. Where the destination is a device, a notification of the new message can be provided on the device. When the recipient user selects the message, e.g., through one of the notifications or by accessing a thread the message was posted to, a version of the message can be provided, templated for the destination where the message is being viewed. Additional details on providing a message to a recipient with reference to established destinations are provided below in relation to FIG. 7.

As an example, users Nichole and Sasha may be engaging in a conversation via a message thread. Nichole has previously setup multiple destinations including artificial reality locations of her kitchen counter, her refrigerator, her coffee table, her desk, and her front door; and device locations of her mobile phone, her XR device, and her laptop. Sasha decides to send a "Happy Friday" message to Nichole, to appear on her desk along with a fireworks animation. Sasha forms the message, selects the animation, and selects, from a list of the destinations setup for Nichole, her desk. When Nichole sits down at her desk, she sees (via her XR device) a notification of a message from Sasha on her desk. Nichole performs an air tap on the notification, which causes the "Happy Friday" text with the animation to appear.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Various communication platforms, e.g., messaging platforms, social media, e-mail, or video/audio conferencing, allow users to share content with other users. These platforms often lack the ability to share content in a contextually aware manner. Text, images, and video that is sent using such platforms often loses a dimension and meaning, resulting in no way for users to share messages intended for viewing in a certain context (e.g., when a user arrives home, at the user's office, or on the user's laptop). Artificial reality systems can allow a user to interact with physical objects and virtual objects in their own artificial reality environment, but are missing processes to share virtual objects and messages with other users in particular artificial reality destinations, e.g., in relation to other real and virtual objects which may provide needed context to the message. Furthermore, when users communicate remotely with existing technologies, the user's space (e.g., room, location, physical area) often becomes disassociated with how they communicate. A user communicating online with another may want the other user to receive objects at a certain meaningful area but is incapable of doing so with current systems.

The XR messaging system and processes described herein are expected to overcome these problems associated with conventional communication platforms and artificial reality systems. By allowing users to send messages to particular XR spaces and devices, the XR messaging system can create a more immersive, context sensitive communication experience. Users can thus attach meaning to different XR spaces and devices and share messages and objects that are relevant to the selected destination. The XR messaging system can also make communication more seamless by reducing notification barriers that are prevalent with existing communication platforms (e.g., text message notifications, email reminders, etc.), since users can discover messages and virtual objects sent to their XR spaces, without having to be notified when those messages would not be relevant (e.g., when the user is not at the space). Because destination specific messages can be immersive to the user and appear in meaningful areas, the XR messaging system can lessen the need for video/audio conferencing to present content, reduce the volume of messages and email exchanged to describe shared content, and mitigate in-person traveling time to interact with the destination spaces. The result is reduced traffic and bandwidth taken for communication systems, lower latency, expanded network capacity, and increased computing resources. Furthermore, because destinations can have customized permissions for both sending and viewing messages and shared content, the XR messaging system provides enhanced privacy and security.

Several implementations are discussed below in more detail in reference to the figures. FIG. 1 is a block diagram illustrating an overview of devices on which some implementations of the disclosed technology can operate. The devices can comprise hardware components of a computing system 100 that can conduct a message thread between multiple users where individual messages can be designated for delivery to particular artificial reality locations or devices. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR messaging system 164, and other application programs 166. Memory 150 can also include data memory 170 that can include data objects defining destinations (which may include sending and viewing permissions, messages, message templates (defining mappings for what data types the templated can receive and what destination types for which the templated generates output), notification templates, message thread histories, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
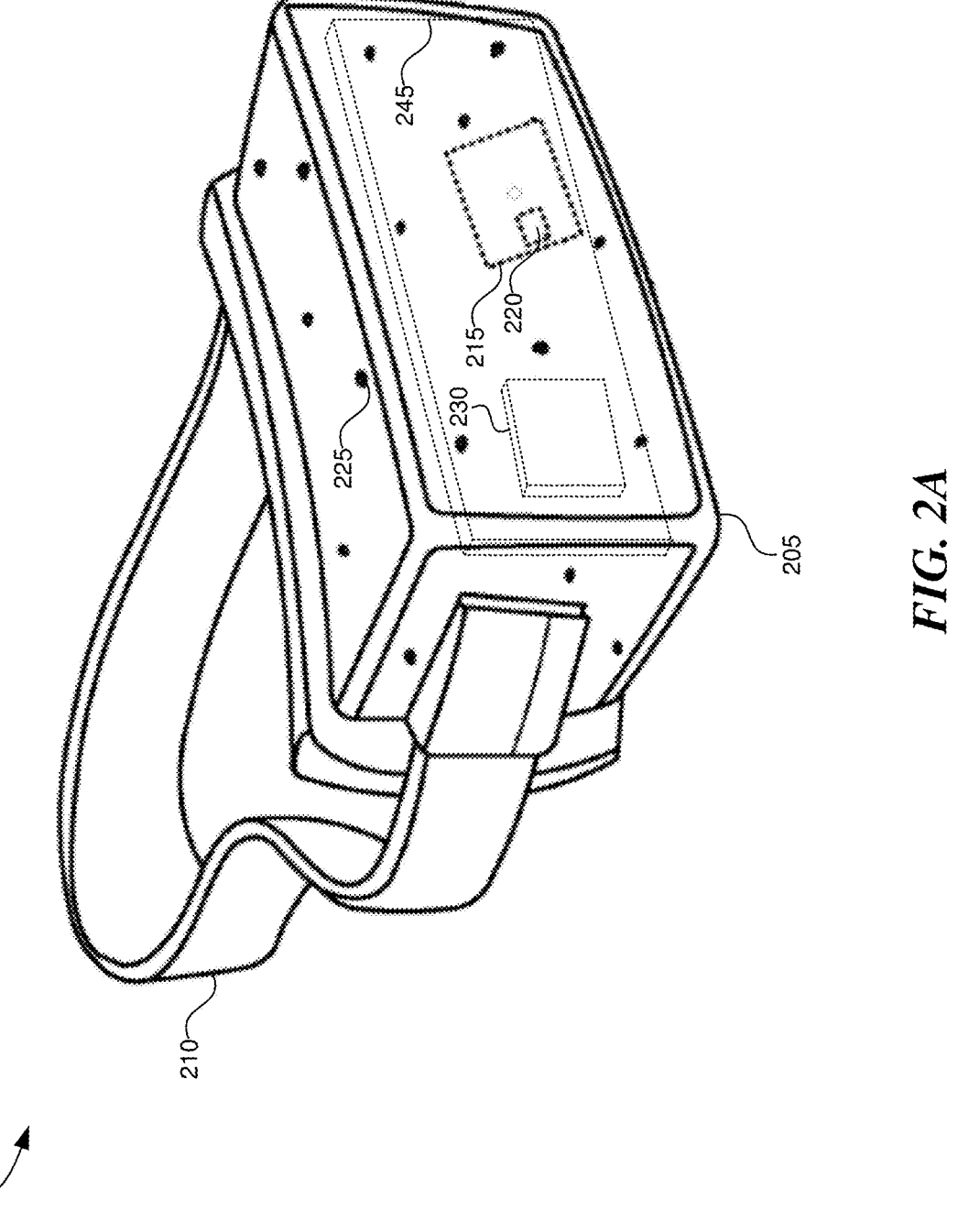
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
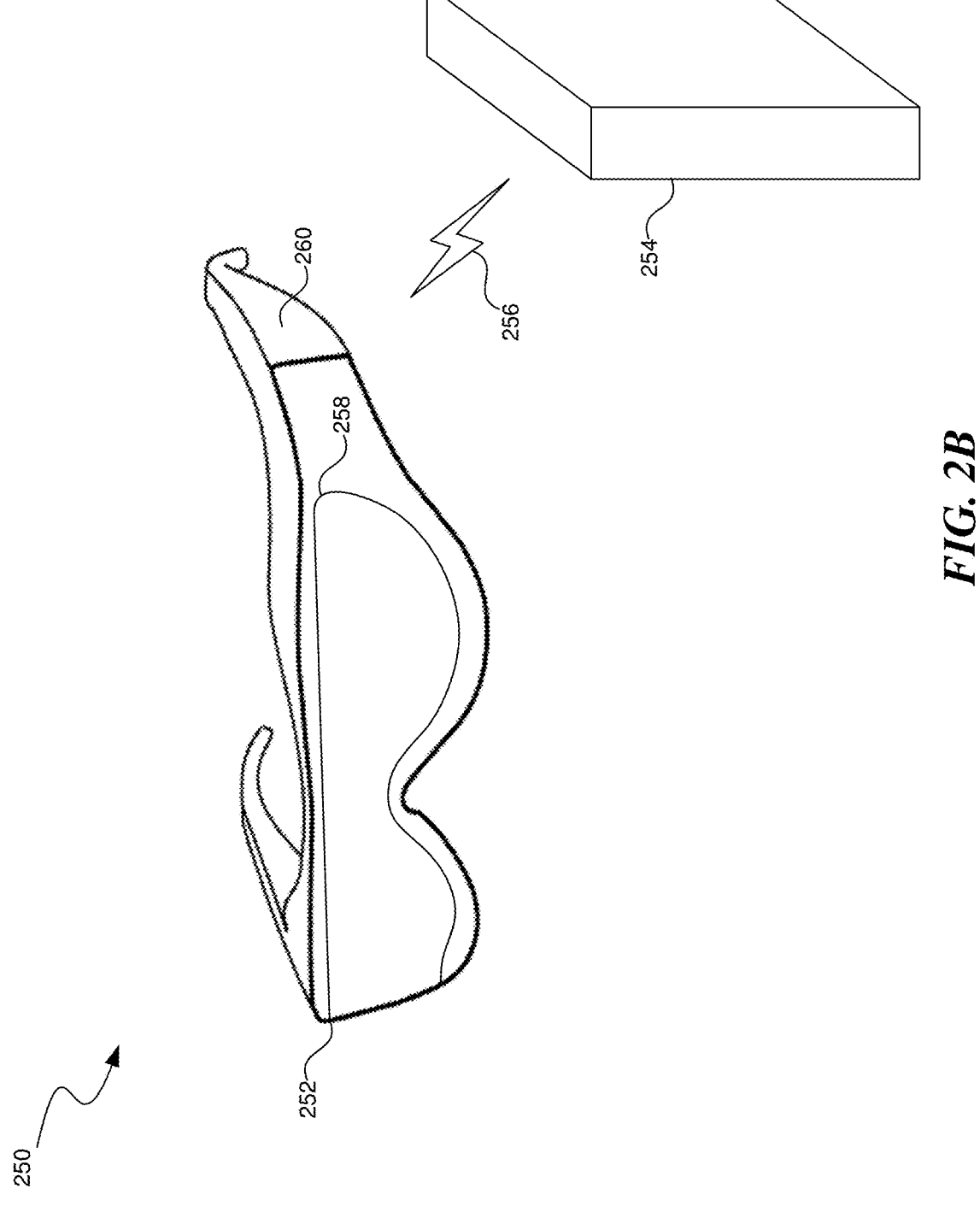
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
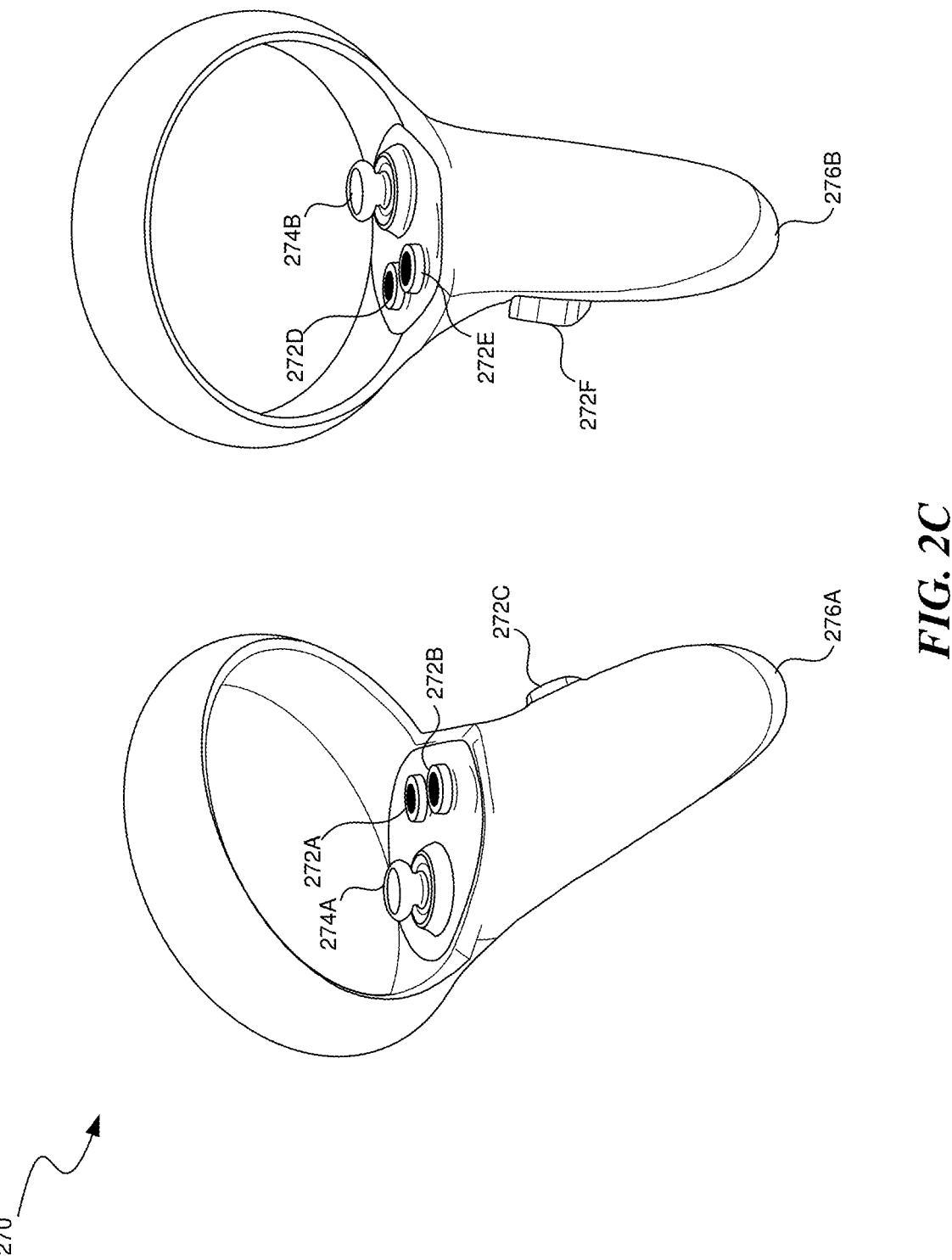
FIG. 2C is a wire diagram illustrating controllers which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
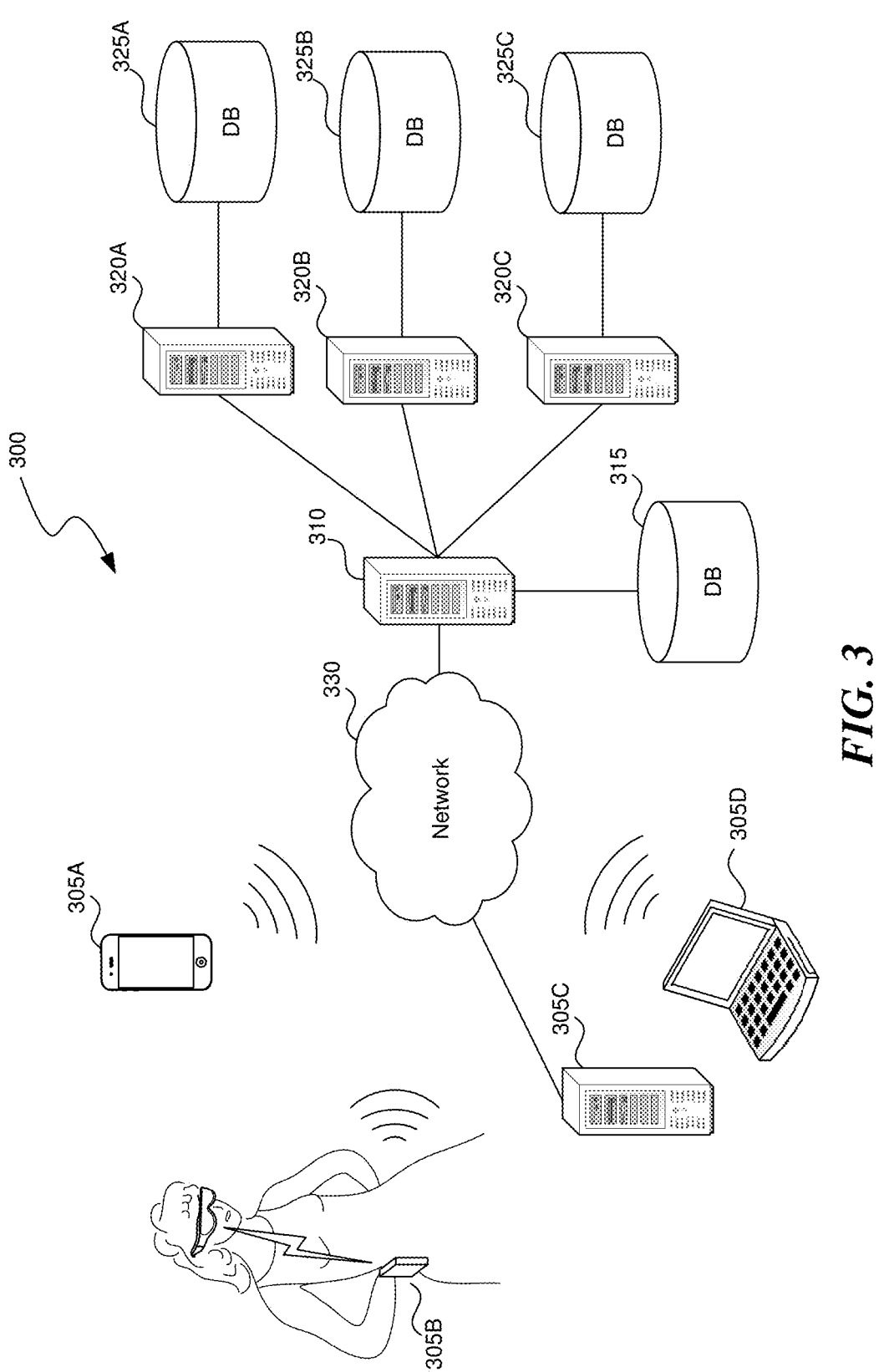
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their personalized avatar) with objects or other avatars in a virtual environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
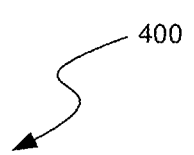
FIG. 4 is a block diagram illustrating components which, in some implementations, can be used in a system employing the disclosed technology.
Figure 4:
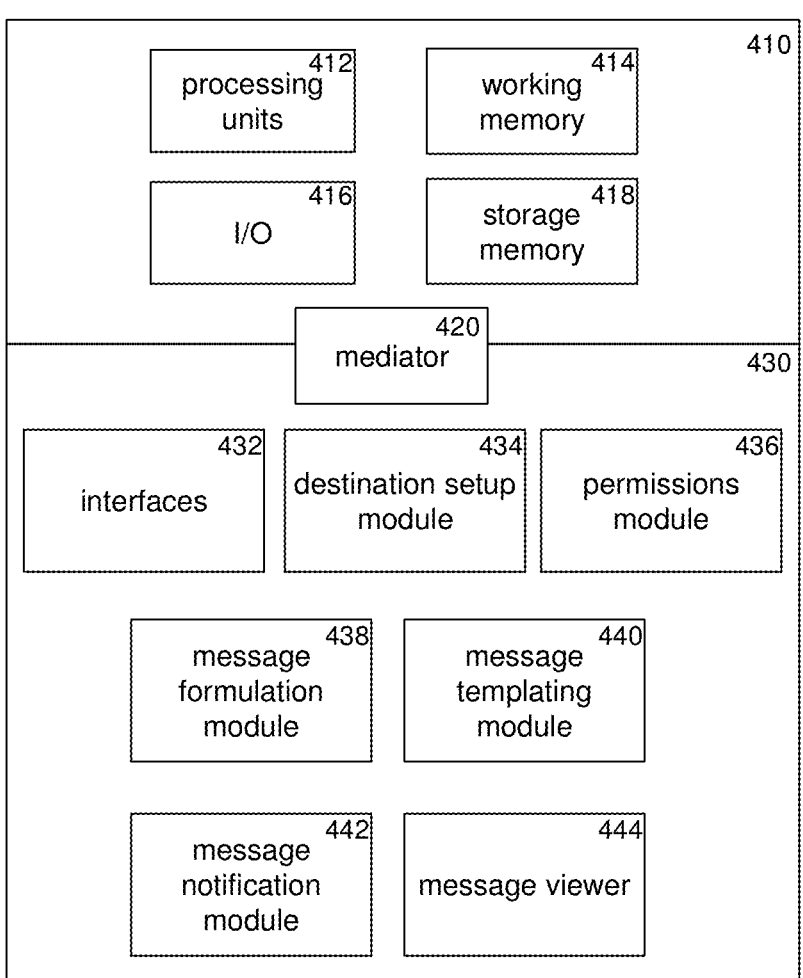

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for conducting a message thread between multiple users where individual messages can be designated for delivery to particular artificial reality locations or devices. Specialized components 430 can include destination setup module 434, permissions module 436, message formulation module 438, message templating module 440, message notification module 442, message viewer 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Destination setup module 434 can receive indications of devices, portions of real-world surfaces, real-world objects, or real-word volumes and can designate them as message destinations for a user. Additional details on establishing a destination to which messages can be sent are provided below in relation to FIG. 5.

Permissions module 436 can establish permissions for who can send messages to a designated destination and for who can view content placed in a designated destination. Additional details on establishing permissions for a destination are provided below in relation to blocks 504 and 506 of FIG. 5.

Message formulation module 438 can receive content for a message for a recipient user. The message content can include various content items such as text, voice, video, audio, image, 3D model, animation, special effect, emoji, contacts, location pins, or virtually any other type of content item that a messaging platform can support. Message formulation module 438 can also receive a selection of one or more destinations (defined by a recipient version of destination setup module 434) for the message. Additional details on formulating a message to be delivered to a particular destination are provided below in relation to blocks 602 and 604 of FIG. 6.

Message templating module 440 can receive a message created by message formulation module 438 and can format the message using a template defined for types of the content in the message and for a type of the destination selected for the message. Additional details on templating a message for selected destination are provided below in relation to block 606 of FIG. 6.

Message notification module 442 can receive an indication of a received message and the destination for which the message is designated and can cause a notification to be provided in relation to the designated destination. In some cases, this can include causing a notification of the message to be shown in a designated XR location or on a designated device. In other cases, this can include showing a notification that the message is available at the designated destination, even when the user is not presently at that location or on that device. Additional details on providing destination specific notifications for messages are provided below in relation to blocks 704-710 of FIG. 7.

Message viewer 444 can cause the message to be displayed at the designated destination. In various implementations, this can also include providing an indication of the thread the message is a part of, providing response options, enabling content from the message to be added to the recipient user's environment outside the designated destination, etc. Additional details on viewing messages are provided below in relation to blocks 712 and 714 of FIG. 7.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
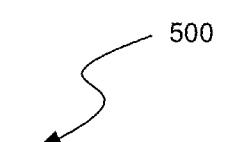
FIG. 5 is a flow diagram illustrating a process used in some implementations of the present technology for establishing destinations to which messages can be sent.
Figure 5:
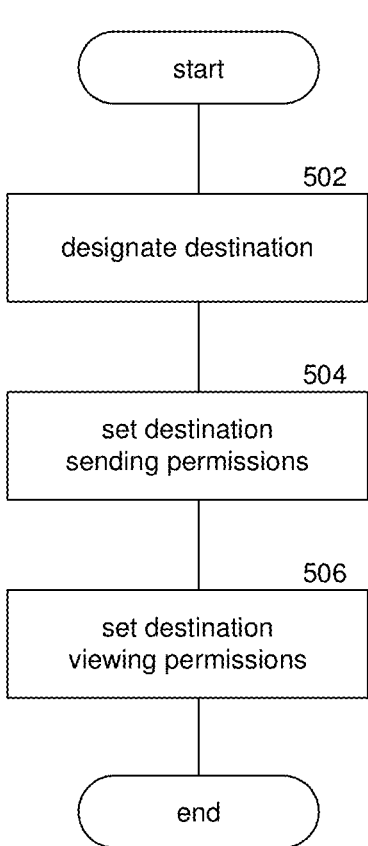

FIG. 5 is a flow diagram illustrating a process 500 used in some implementations of the present technology for establishing destinations to which messages can be sent. In some implementations, process 500 can be performed on a computing system of a messaging receiver, either as a manual process with user input or as part of another process such as the setup for an XR device or installation of a messaging application. In some cases, process 500 can be performed on a messaging platform computing system, with input from a receiving user or based on default parameters such as default location designations and permissions. In some implementations, process 500 can be performed multiple times for various designated destinations.

At block 502, process 500 can designate a destination. In various implementations, the destination can be an XR location or a device associated with a recipient user. In some cases, the recipient user can manually select an XR location or device as a destination (e.g., through a destination selection widget). In some cases, process 500 can recognize an XR location (surface, volume, or object) the user may want to designate as a destination (e.g., identifying an area associated with the user such as the user's home, office, or car and identifying certain commonly selected surfaces within that area such as a front door, coffee table, counter, bedside table, refrigerator door, desk, etc.) and suggest the XR location to the user as a destination. In some implementations, an XR location can be a designated object, such as a television, computer, coffee mug, wallet, purse, mobile phone, pet, couch, etc. In various cases where an object type is designated as an XR location, a particular object (e.g., my coffee mug I use every morning) can be the designated destination or the object type (e.g., any coffee mug I see) can be the designated destination. Thus, a message sent to that object can either appear in relation to the particular object (e.g., only show the message on my coffee mug) or on any type of that object (e.g., show the message on the next or all coffee mugs I see). In some cases, a destination device can be manually selected by a user or can be selected when a user installs a communication app or connects to a communication channel through the device. For example, when a user installs a messaging app on her mobile device, the device can be automatically designated as a destination or can be suggested to the user as a destination which can be designated upon user confirmation. In some implementations, the destination can be designated by default (e.g., the user's mobile phone, front door, and coffee table—if the user has these—are automatically designated as destinations, which the user can manually un-designate.

At block 504, process 500 can set sending permissions for the destination designated at block 502. Sending permissions can specify who can send messages to the designated destination. In some cases, sending permissions can be set to allow ("whitelist") particular users while disallowing others or only disallow ("blacklist") particular users while allowing others. In some implementations, permissions can be set according to defined relationships between other users and the recipient user. For example, permissions (e.g., as a whitelist or blacklist) can be set for groups that have a specified relationship to the user as defined on a social graph, as discussed above. As a more specific example, a user may whitelist only those users designed as "family," "friends," or "friends of friends" on the social graph or only those users the recipient user has interacted with above a threshold amount. In some cases, the sending permissions for a designated destination can be initially set to defaults, such as social graph friends, which the recipient user can adjust as desired.

At block 506, process 500 can set viewing permissions for the destination designated at block 502. Viewing permissions can specify who can view a message, notification, or other content added to the designated destination. For example, a recipient user will be able to view a message sent to her refrigerator door and that destination can have "family" viewing permissions allowing the recipient user's wife to also see the message on the refrigerator door when she is wearing an XR device. Similarly to the sending permissions, in some cases, viewing permissions can be set as whitelist or blacklist options and/or can be based on individual designations or group designations. Also similarly to sending permissions, viewing permissions may be based on default settings or use social graph relationships.

Process 500 can be repeated for additional destination designations as the are selected or suggested to the recipient user.

Figure 6:
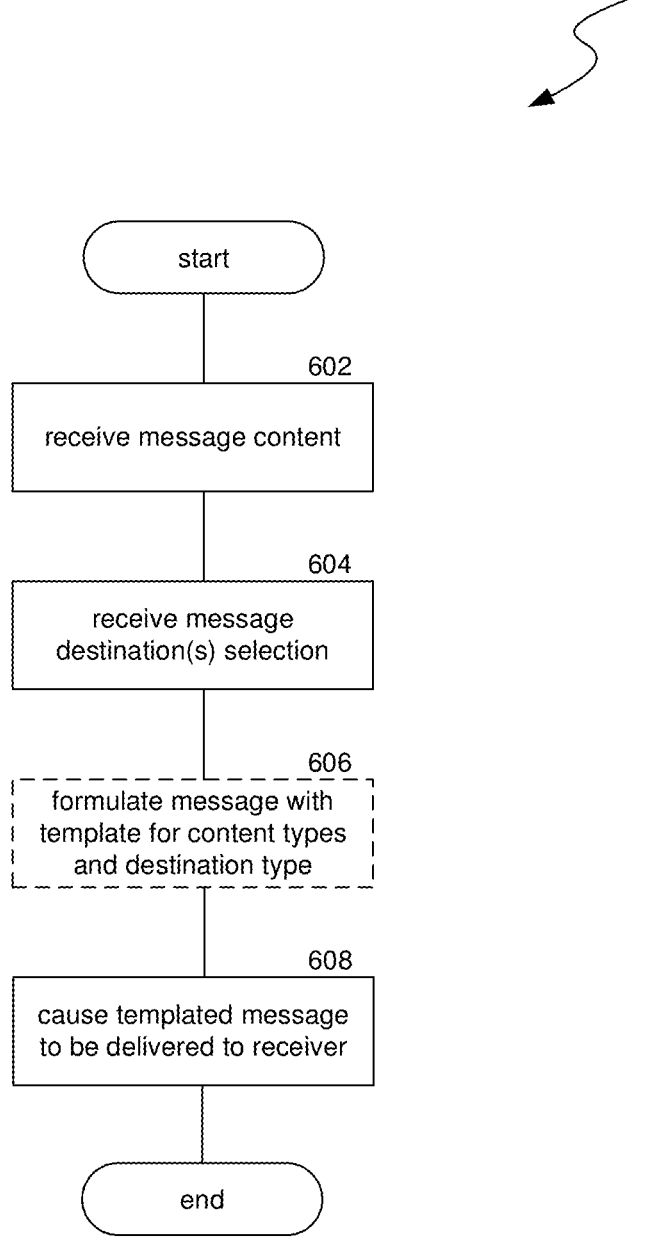
FIG. 6 is a flow diagram illustrating a process used in some implementations of the present technology for sending a message to a destination established for a recipient.

FIG. 6 is a flow diagram illustrating a process 600 used in some implementations of the present technology for sending a message to a destination established for a recipient. In some implementations, process 600 can be performed on a computing system of a sending user. In some implementations, aspects of process 600 (such as block 606) can be performed on the computing system of a sending user, the computing system of a receiving user, or the computing system of an intermediate communication platform. In some cases, process 600 can be performed in response to a sending user accessing a messaging application or platform.

At block 602, process 600 can receive content for a message for a recipient user. The message content can include various content items such as text, voice, video, audio, image, 3D model, animation, special effect, emoji, contacts, location pins, or virtually any other type of content item that a messaging platform can support. In some implementations, the message content can be provided in the context of an existing message thread with one or more other users or as an initial message to one or more other users. For example, a user may select a representation of another user (e.g., a contact in a messaging app., a person representation in an artificial reality environment, by entering a phone number, etc.) which can be associated with an interface to select a messaging destination. An example of such a selection interface in an artificial reality environment is provided below in relation to FIG. 8.

At block 604, process 600 can receive a selection of one or more destinations for the message. The destination(s) can be selected from a list of destinations established for the recipient(s) of the message, e.g., via process 500. In some cases, the list of destinations that a sending user can select from is filtered according to the destinations for which that sending user has sending permissions (as defined by the sending permissions of various destinations established at block 504). In some implementations, a message destination may not be selected at block 604 or no destinations may be established for the recipient user, in which case a default destination may be selected or the message may be designated for general delivery to the message thread without going to a particular destination. In some cases, a sending user can select multiple destinations for the message. In some cases, the sending user may customize the message for each selected destination (e.g., including different content, specifying how the message will appear in each destination, changing when the message will appear in each destination, etc.) Where multiple destinations are selected, the XR messaging system may deliver the message to all of the selected destinations or just to the destination the recipient user interacts with first after the message is sent.

At block 606, process 600 can formulate the message using a template defined for types of the content received at block 602 and for a type of the destination selected at block 604. While as mentioned above, any block can be rearranged or omitted, block 606 is shown in broken lines to explicitly illustrate that it can be part of process 600, but in some cases can be performed by another computing system. Thus, block 606 can be performed on the computing system of the sender, the computing system of the receiver, or the computing system of and intermediary (e.g., a provider of the messaging platform being used). Templates can be defined to take certain types of content and insert that content into a structure that can be output by a particular destination type. For example, a destination type can be a device and templates can be defined to output content as a text message on that device, as an email on that device, as a push notification on that device, etc. As another example, a destination type can be an XR location and a template can be configured to create a 3D volume to hold representations of the content form the message. In some cases, XR location types can have sub-types such as a flat surface, an object with a particular shape, a volume in space, etc., and templates can be configured to output content to one of these sub-types. The templates can also be configured to enter different content types of the message differently. For example, a template for a 3D space can be configured to show an image from the message as a 2D panel in the 3D space and text from the message as a carousel that is animated to circle around the image. In some cases, the message creator can define their own templates or select from a library of templates that match their provided content types and destination types for the message, allowing them to customize how the message will appear to the recipient. Some templates can have customizations or effects that the sending user can select from to configure how the message is viewed. Where multiple destinations were selected at block 604, block 606 can be repeated for each destination or destination type.

At block 608, process 600 can cause the templated message to be delivered to a computing system of the recipient user associated with the destination(s) designated at block 604. For example, if the destination is a device the message can be delivered to that device. If the destination is an XR location, the message can be delivered to the XR device of the recipient user for delivery when the recipient user is near the XR location. In some cases, the message may only be delivered to the XR device once the XR device signals to a messaging system that it is near the XR location. Following block 608, process 600 can end until the sending user reinitializes it to send another message. In some cases, delivery of the message can be a result of adding the message to a message thread (e.g., a record of the conversation between a group of two or more people) maintained for the current conversation. In various implementations, the message thread can be stored locally on a sending device or centrally by a messaging platform. Thus, causing the templated message to be delivered to the computing system of the recipient user can include sending the message to the messaging platform to record the message in relation to the message thread.

Figure 7:
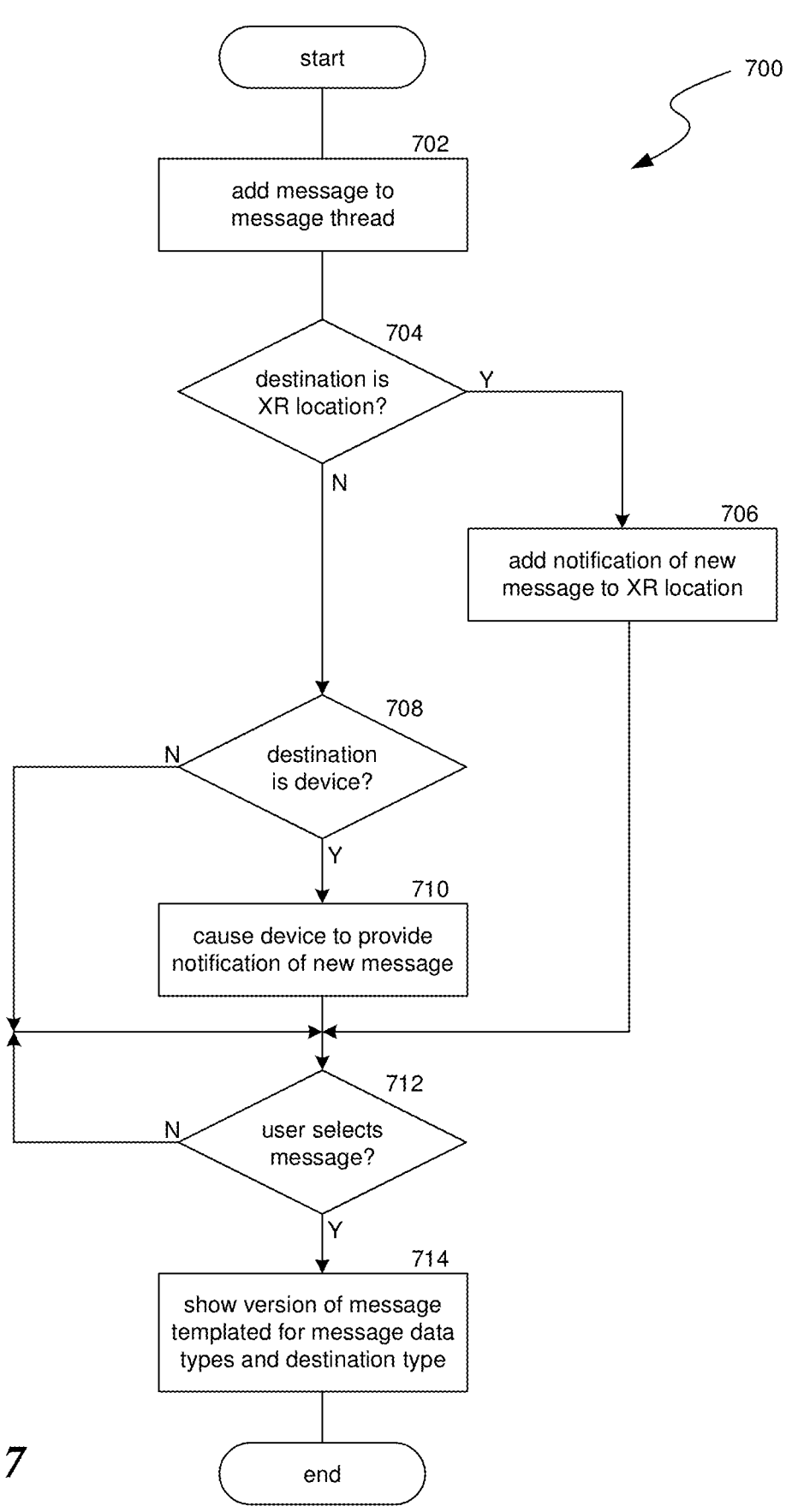
FIG. 7 is a flow diagram illustrating a process used in some implementations of the present technology for providing a message to a recipient with reference to established destinations.

FIG. 7 is a flow diagram illustrating a process 700 used in some implementations of the present technology for providing a message to a recipient with reference to established destinations. In some implementations, process 700 can be performed on a computing system of a receiving user. In some cases, process 700 can be performed in response to the computing system of a receiving user receiving an indication of a newly received message. In some cases, process 700 can be performed for each specified destination of a received message.

At block 702, process 700 can receive a message from a message sender (e.g., as a result of block 608). If block 606 has not been performed to template the message, process 700 can also perform block 606. In some cases, messages between users are all recorded in a message thread (e.g., a record of the conversation between a group of two or more people). In various implementations, the message thread can be stored locally on a recipient device or centrally by a messaging platform. If the received message has not been added to the message thread, process 700 can add the message to the message thread.

From block 704, if the destination for the received message (e.g., specified at block 604) is not an XR location, process 700 can continue to block 708. If the destination for the received message (e.g., specified at block 604) is an XR location, process 700 can continue to block 706. At block 706, process 700 can add a new message notification for the received message to the designated XR location. In some cases, adding a notification to the XR location can include indicators such as an image or text indicating who the message is from, a preview of the message, an animation or icon associated with new messages, etc. In some implementations, adding a notification to an XR location only provides output at that location when the user is viewing the location. In some implementations, a notification of the newly received message can be provided on an XR device anywhere the user is, indicating the destination location where the message can be retrieved. For example, a notification can state, "new message from Grandma Jane on kitchen counter."

From block 708, if the destination for the received message (e.g., specified at block 604) is not a particular device, process 700 can continue to block 712. If the destination for the received message (e.g., specified at block 604) is a device, process 700 can continue to block 710. At block 710, process 700 can add a new message notification for the received message to the designated device. In some cases, process 700 can be performed on the designated device, in which case the determination of where to display the notification (i.e., blocks 704 and 708) can be performed by a separate routing system (e.g., of the messaging platform) causing the message to be delivered to the device. In some cases, adding a notification to the device can include adding an indicator on an icon of a messaging app, initiating a push notification, displaying a message thread, etc.

At block 712, process 700 can determine whether a user has selected a message to view. In various implementations, selection of a message can include interacting with a notification from block 706 or 710, selection of the message by viewing the message thread (e.g., through a messaging app or widget), viewing the location were the message was delivered (e.g., viewing the dining room table where the dining room table was the designated destination), etc. If the user has selected a message to view, process 700 can continue to block 714. Otherwise, process 700 can remain at block 712 until such a selection is made.

At block 714, process 700 can show a version of the selected message, templated based on A) data types in the message and B) a destination type where the message is being viewed. As discussed above, a message can be formatted depending on the content of the message and where the message is being viewed (referred to herein a "templating" the message). Template selection can be automated to make sure that the template the message content is entered into can accept the message content and can format the content for the destination. Additional customizations can affect which template is selected or what parameters of a template are used. In some cases, these customizations can include selections for the message by the sending user or preferences specified by the recipient user. For example, the sending user can select various placements of portions of the message within a 3D volume template or how effects are applied to portions of the message. As another example, the recipient user can setup preferences to hide non-textual parts of messages unless the user maximizes them, can exclude certain categories of content (e.g., content the recipient user may find offensive or annoying), can limit the size of messages or types of message content, or can define how messages of particular types or from particular senders is displayed or positioned in 3D space of the destination.

In some implementations, a destination can retain a history of content that has been displayed in that destination, even after the content been removed (by the sender, receiver, or from a time-out process that automatically removes content after a threshold time from message deliver or inactivity). Thus, an owner (or in some cases an authorized viewer) of a destination can review a conversation history for a destination to see associated content that may no longer be shown in the destination. In some cases, a viewing users set a timeframe for a destination to see content that was added to the destination during the designated timeframe.

In some implementations, content displayed in an XR location destination can be viewed by other users in addition to the owner of that destination. For example, a destination can have view permissions (e.g., set at block 506) allowing specific users, groups of users, or users generally to view content in a destination. In some cases, the viewing permissions can be conditional, e.g., on who sent a message, the content of the message, when the message was sent, preferences specified by the sending user, etc. For example, a user George may have setup an XR location and his friend Mary has sent George a "Happy Halloween" message to that XR location, without specifying any viewing permission on the message. George can have setup that XR location such that messages can be viewable by others if they are related, on the social graph, as friends of the sending user. Thus, Samantha, a friend of Mary's on the social graph, when viewing the XR location through her XR device, can see the "Happy Halloween" message from Mary while Mohamad, who is not specified as a friend of Mary on the social graph, is not able to see the "Happy Halloween" message from Mary when viewing the XR location through his XR device.

In some implementations, a message delivered to a particular destination can also be viewed from other locations or interfaces. For example, a message may be delivered to an XR location, however, when the recipient user accesses the message thread between himself and the sending user (e.g., using a messaging app on his mobile phone or XR device), he may be able to view the message in the thread even when not using the destination. Following viewing of the message, process 700 can end.

Figure 8:
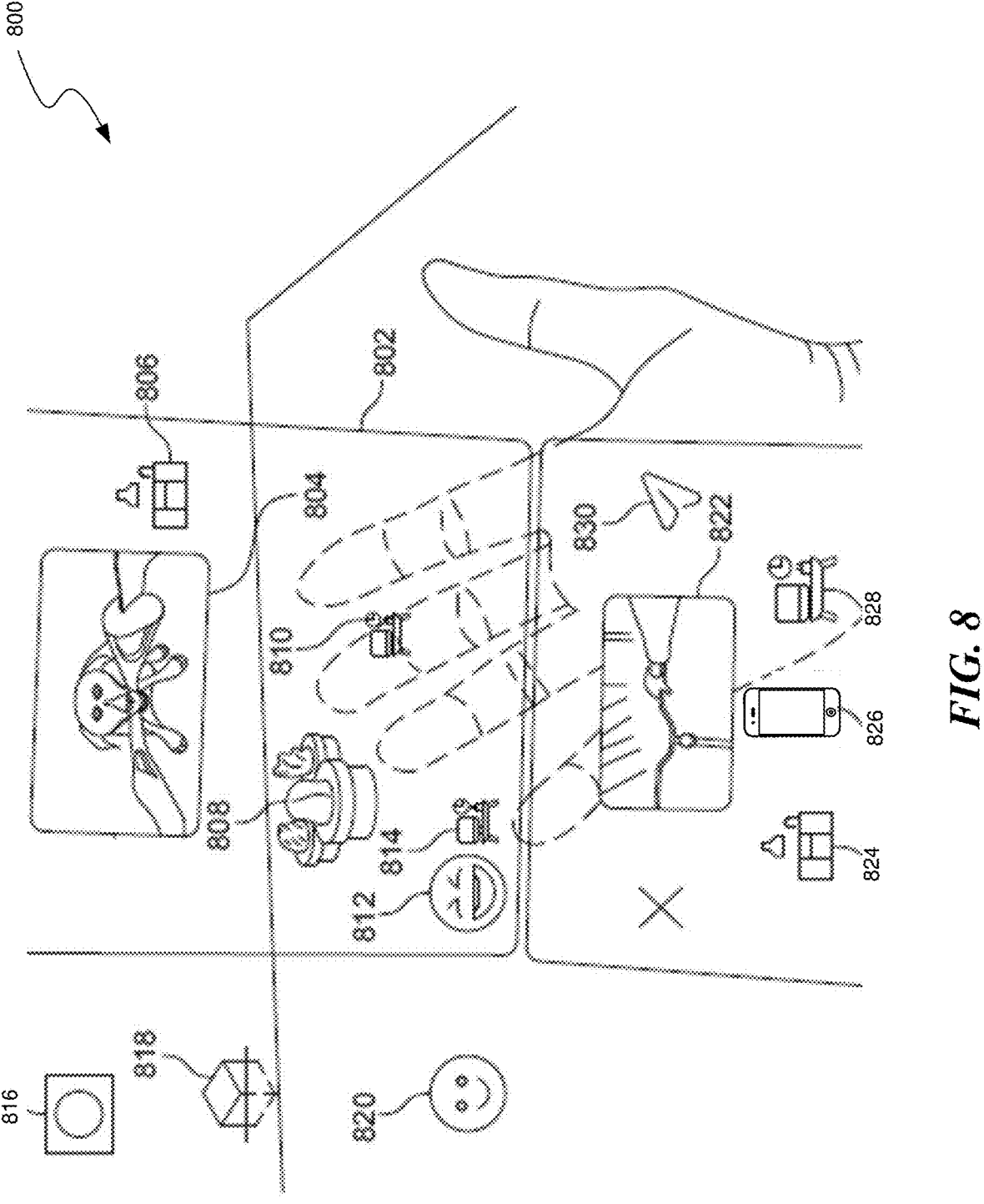
FIG. 8 is a conceptual diagram illustrating an example of a sender selecting an established destination for a message.

FIG. 8 is a conceptual diagram illustrating an example 800 of a sender selecting an established destination for a message. Example 800 includes a virtual message thread panel 802 that a user is "holding" in an artificial reality environment. The virtual message thread panel 802 includes previous messages between a sending and a receiving user, including picture message 804, 3D model message 808, and emoji message 812. Each of these messages is associated with an icon indicating where that message was delivered, including an icon 806 for a kitchen destination and icons 810 and 814 for an office destination. Message thread panel 802 is provided with control 816 for selecting images for the new message, control 818 for scanning a real world object to make a 3D model for the new message (or to select an existing 3D model), and control 820 for selecting emojis for the new message. In example 800, the user has used control 816 to select image 822 for the message she is creating.

Message thread panel 802 is also provided with controls 824, 826, and 828 for selecting a destination for the message. Controls 824, 826, and 828 correspond to locations the recipient has established where the depicted sending user has permission to send to those destinations. Control 824 is for sending messages to an XR location in the recipient's kitchen, control 826 is for sending messages to a mobile device of the recipient, and control 828 is for sending messages to an XR location in the recipient's office. Upon adding the content 822 to the message and selecting a destination, the sending user can activate control 830 to send the message to the designated destination of the recipient.

Figure 9A:
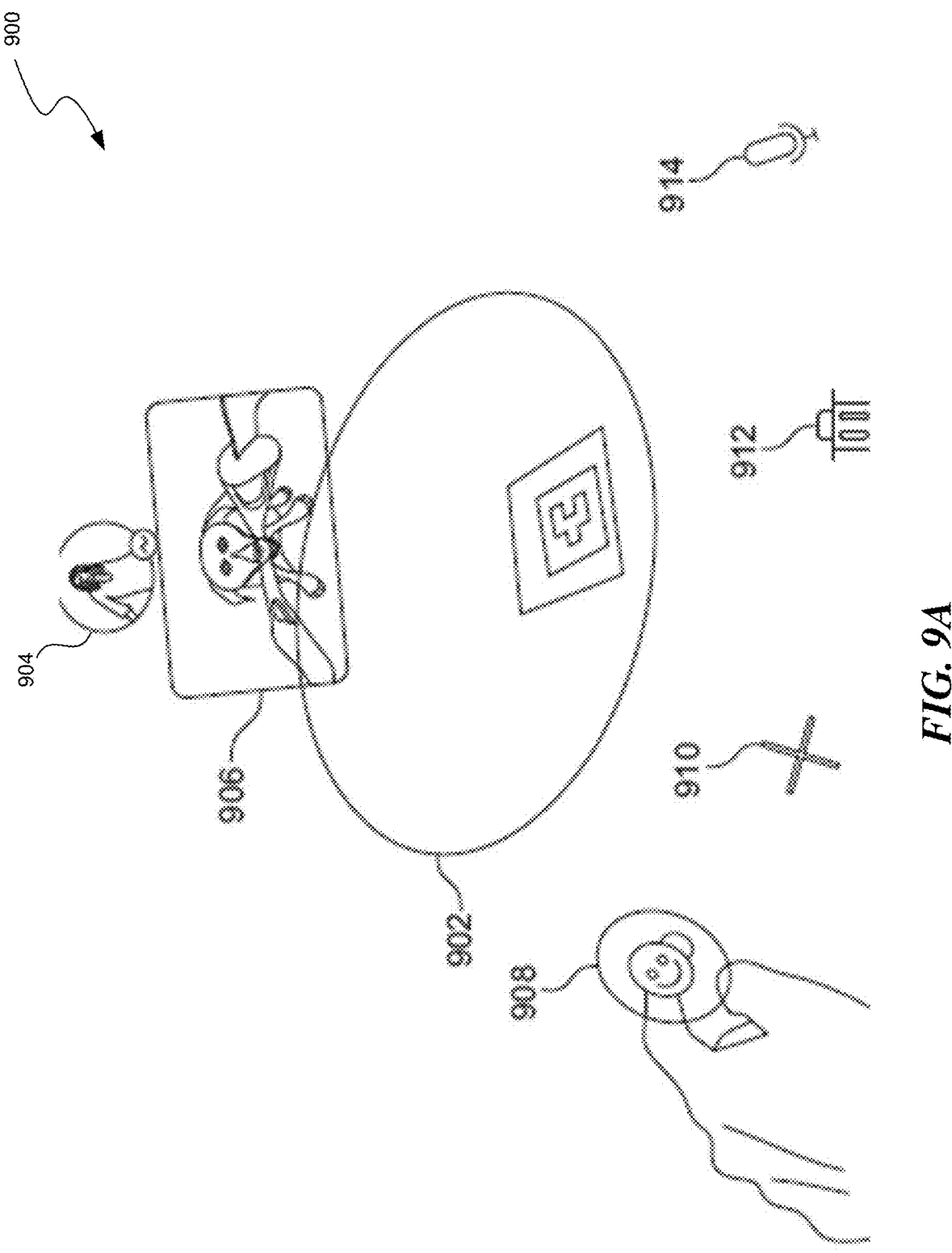
FIG. 9A is a conceptual diagram illustrating an example of receiving a message at an established surface destination.

FIG. 9A is a conceptual diagram illustrating an example 900 of receiving a message at an established surface destination. Example 900 includes a real-world area 902 designated as a XR location for receiving messages. A picture message 906, from a sending user indicated by user badge 904, has been delivered to the XR location 902 and is being viewed by a recipient user. The recipient user has options 908-914 to respond to the message 906, including an option 908 to reply with an emoji, an option 910 to reply with an image, an option 910 to delete the message 906 from the XR location 902, and an option 914 to reply with a voice message. In some cases, the user can perform other actions as well, such as pulling the image out of the message 906 and placing it elsewhere in her environment.

Figure 9B:
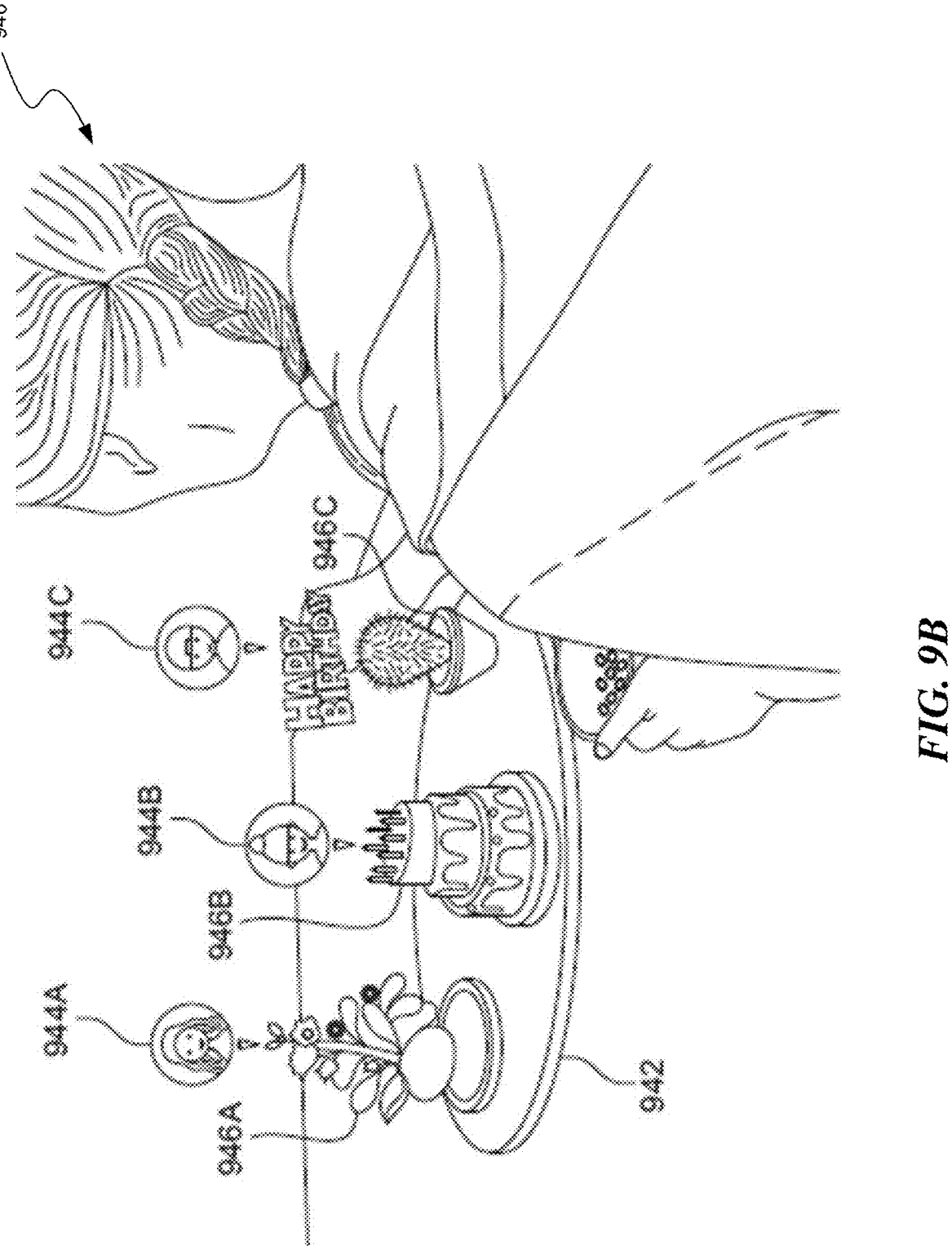
FIG. 9B is a conceptual diagram illustrating an example of receiving a messages from multiple different users at an established destination.

FIG. 9B is a conceptual diagram illustrating an example 940 of receiving a messages from multiple different users at an established destination. Example 940 includes a real-world area 942 designated as a XR location for receiving messages. Multiple 3D model messages 946A-946C, from corresponding sending users indicated by user badges 944A-944C, have been delivered to the XR location 942 and are being viewed by a recipient user.

Figure 9C:
FIG. 9C is a conceptual diagram illustrating an example of receiving a message at an established object destination.

FIG. 9C is a conceptual diagram illustrating an example 970 of receiving a message at an established object destination. Example 970 includes a real-world object 972, in this example a mug, designated as a XR location for receiving messages. An animation message 976, from a sending user indicated by user badge 974, has been delivered to the XR location 972 and is being viewed by a recipient user.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for sharing, in an artificial reality (XR) environment, content designated for delivery to XR locations defined in the XR environment and associated with a first user, the method comprising:

receiving, from a second user, a first selection of a first XR location defined in the XR environment as a first destination for the content, receiving, from the second user, a second selection of a second XR location defined in the XR environment as a second destination for the content;

causing at least a first indication of the content to be delivered to the first XR location; and causing at least a second indication of the content to be delivered to the second XR location.

2. The method of claim 1, wherein the first selection of the first XR location is based on the second user having sending permissions for the first XR location, and wherein the second selection of the second XR location is based on the second user having sending permissions for the second XR location.

3. The method of claim 1, wherein the content is automatically formatted in a first format with a first template automatically selected for the content according to A) one or more content types for the content and B) a first type of the first destination; and wherein the content sent to the first selected XR location is formatted in the first format.

4. The method of claim 3, wherein the content is automatically formatted in a second format, different from the first format, with a second template automatically selected for the content according to A) one or more content types for the content and B) a second type of the second destination; and wherein the content sent to the second selected XR location is formatted in the second format.

5. The method of claim 3, wherein the type of the first XR destination defines the first XR location as an XR location with a sub-type specifying at least one of: a horizontal surface; a vertical surface; an object; or a 3D volume; and wherein the selection of the first template for the content is based on the sub-type.

6. The method of claim 3, wherein A) the selection of the first template and/or B) the formatting of the content based on the first template, is further based on preferences set by the first user.

7. The method of claim 1, wherein the first and second users are different.

8. The method of claim 1, wherein the first selection of the first XR location is a selection from among a list including: an XR location; and at least one device associated with the first user.

9. The method of claim 1, wherein the first XR location is defined with viewing permissions specifying that one or more users, other than the first user, can view content in the first XR location; and wherein at least part of the first indication of the content is viewable by the one or more users when the one or more users are viewing the first XR location via an XR device.

10. The method of claim 1, wherein the causing at least the indication of the content to be delivered to the first user at the first XR location includes sending the content via a messaging platform that adds the content to a message thread.

11. A non-transitory, computer-readable storage medium in an artificial reality (XR) environment, configured to share content designated for delivery to XR locations defined in the XR environment and associated with a first user, including executable instructions that, when executed by one or more processors, cause the one or more processors to:

receive, from a second user, a first selection of a first XR location defined in an XR environment as a first destination for content, receive, from the second user, a second selection of a second XR location defined in the XR environment as a second destination for the content;

cause at least a first indication of the content to be delivered to the first XR location; and cause at least a second indication of the content to be delivered to the second XR location.

12. The non-transitory, computer-readable storage medium of claim 11, wherein the first selection of the first XR location is based on the second user having sending permissions for the first XR location, and wherein the second selection of the second XR location is based on the second user having sending permissions for the second XR location.

13. The non-transitory, computer-readable storage medium of claim 11, wherein the content is automatically formatted in a first format with a first template automatically selected for the content according to A) one or more content types for the content and B) a first type of the first destination; and wherein the content sent to the first selected XR location is formatted in the first format.

14. The non-transitory, computer-readable storage medium of claim 13, wherein the content is automatically formatted in a second format, different from the first format, with a second template automatically selected for the content according to A) one or more content types for the content and B) a second type of the second destination; and wherein the content sent to the second selected XR location is formatted in the second format.

15. The non-transitory, computer-readable storage medium of claim 13, wherein the type of the first XR destination defines the first XR location as an XR location with a sub-type specifying at least one of: a horizontal surface; a vertical surface; an object; or a 3D volume; and wherein the selection of the first template for the content is based on the sub-type.

16. The non-transitory, computer-readable storage medium of claim 13, wherein A) the selection of the first template and/or B) the formatting of the content based on the first template, is further based on preferences set by the first user.

17. The non-transitory, computer-readable storage medium of claim 11, wherein the first and second users are different.

18. The non-transitory, computer-readable storage medium of claim 11, wherein the first selection of the first XR location is a selection from among a list including: an XR location; and at least one device associated with the first user.

19. The non-transitory, computer-readable storage medium of claim 11, wherein the first XR location is defined with viewing permissions specifying that one or more users, other than the first user, can view content in the first XR location; and wherein at least part of the first indication of the content is viewable by the one or more users when the one or more users are viewing the first XR location via an XR device.

20. The non-transitory, computer-readable storage medium of claim 11, wherein the causing at least the indication of the content to be delivered to the first user at the first XR location includes sending the content via a messaging platform that adds the content to a message thread.

* * * * *